UNITED STATES PATENT OFFICE.

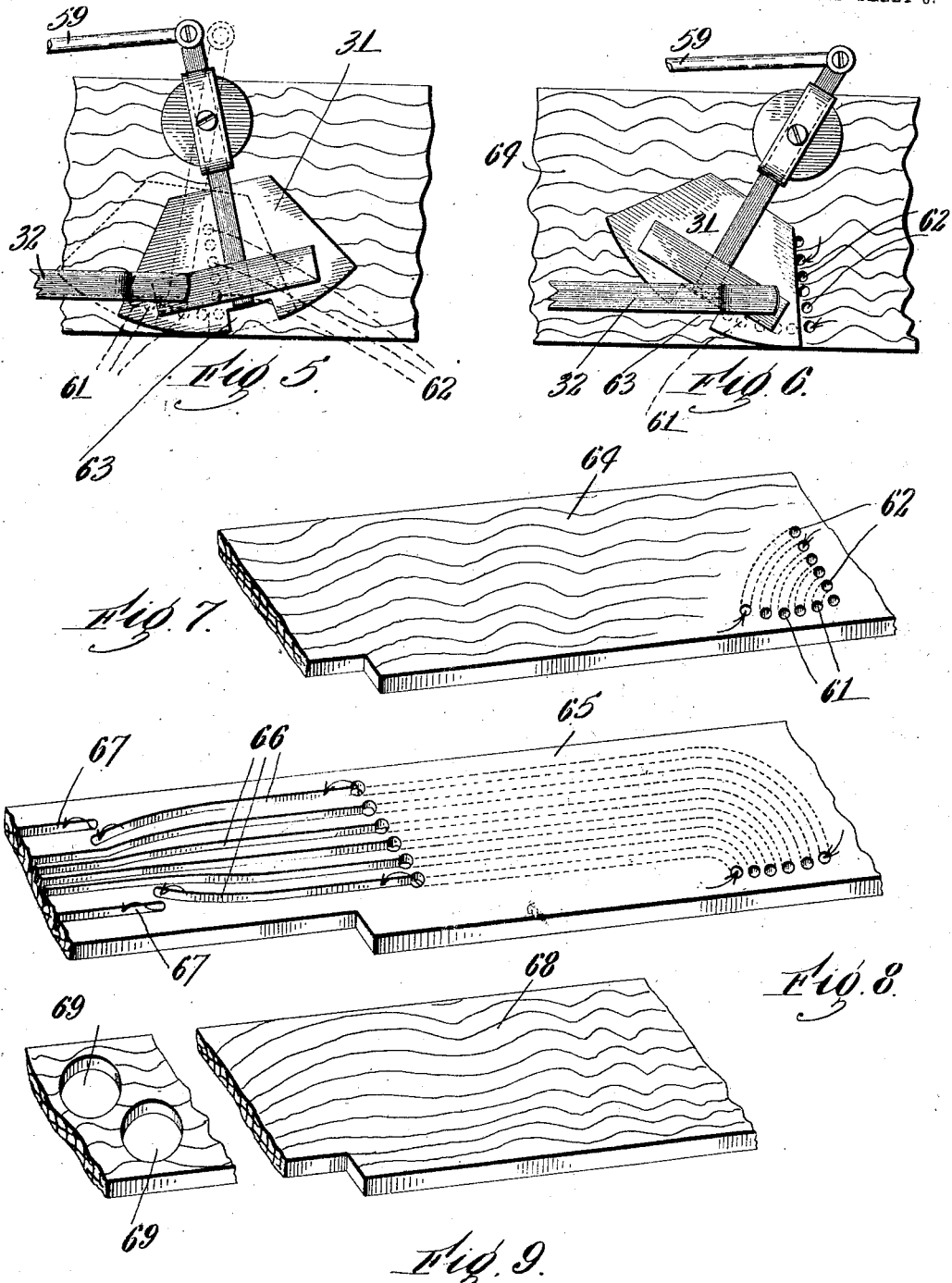

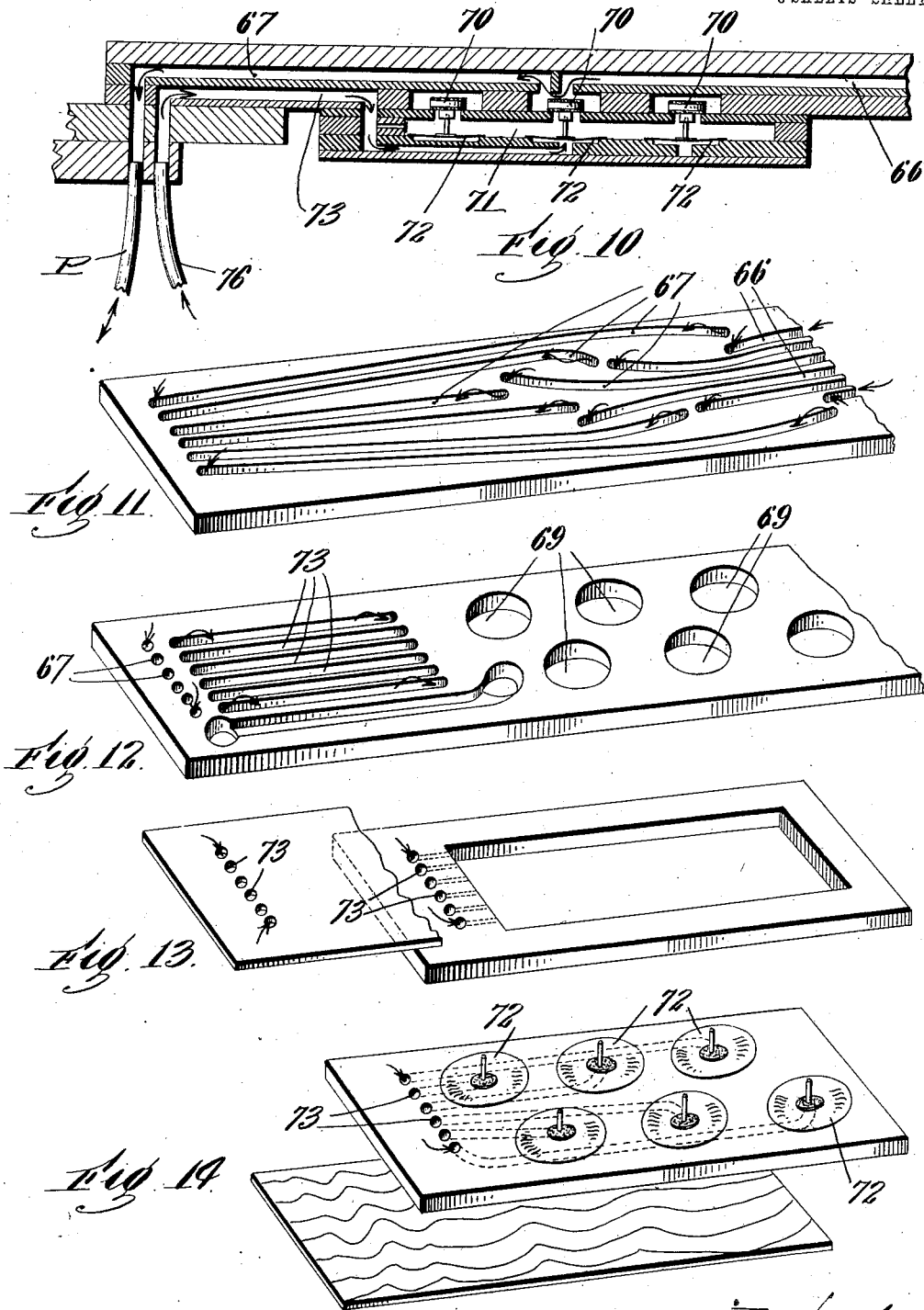

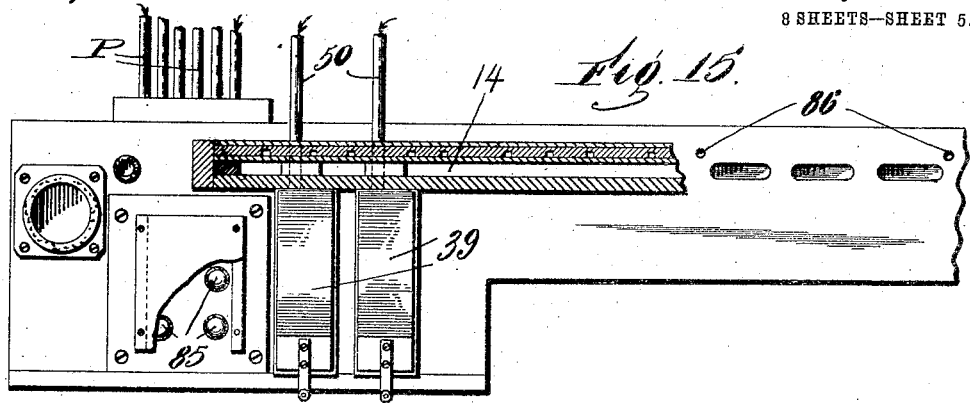
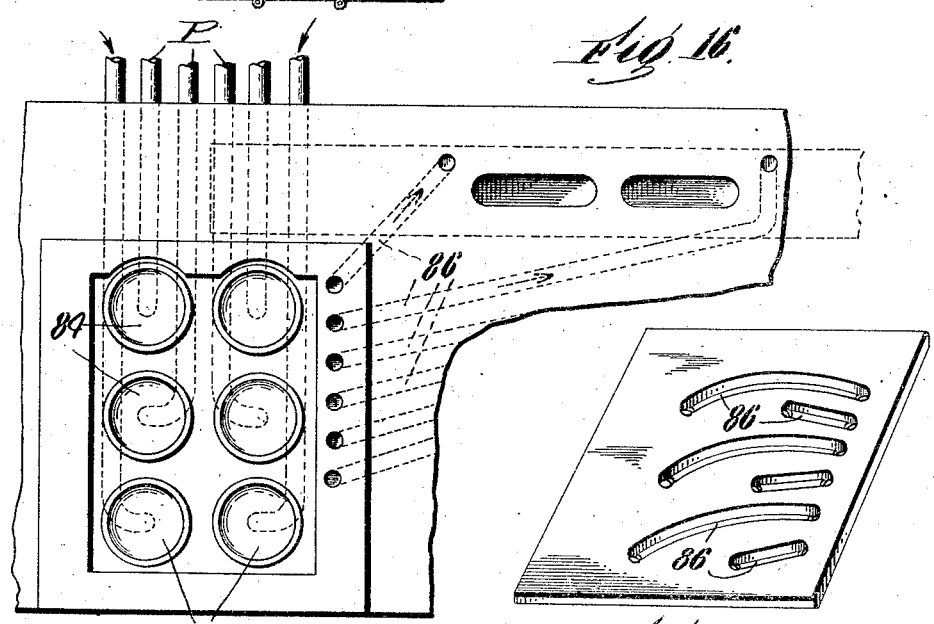
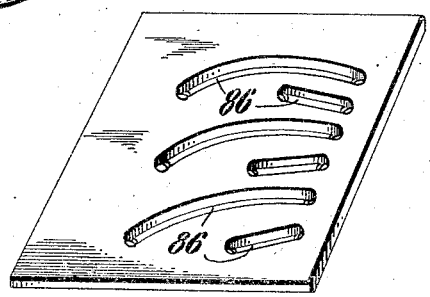
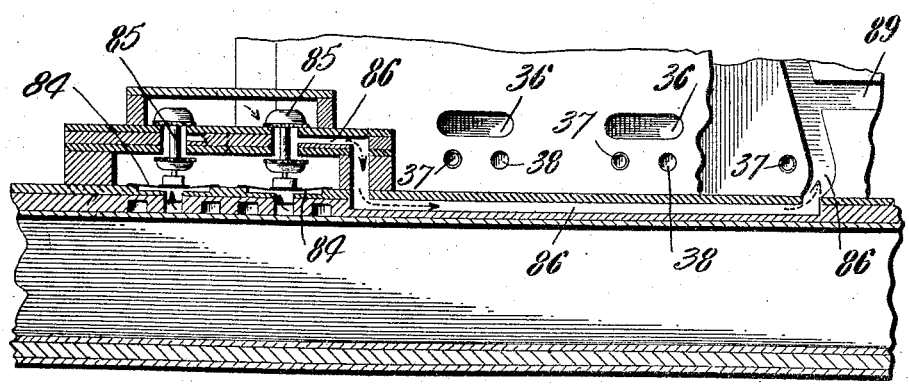

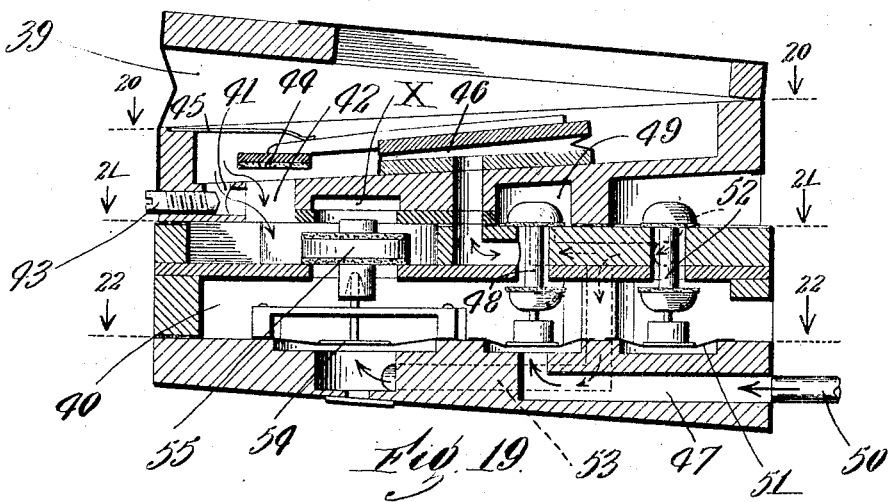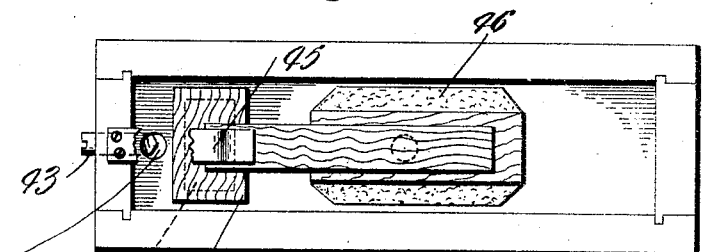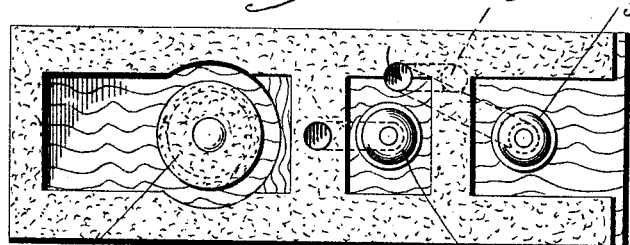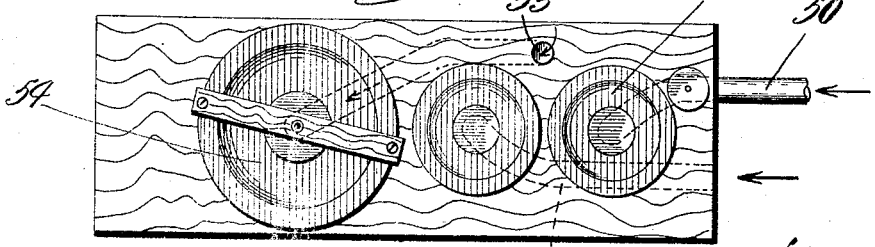

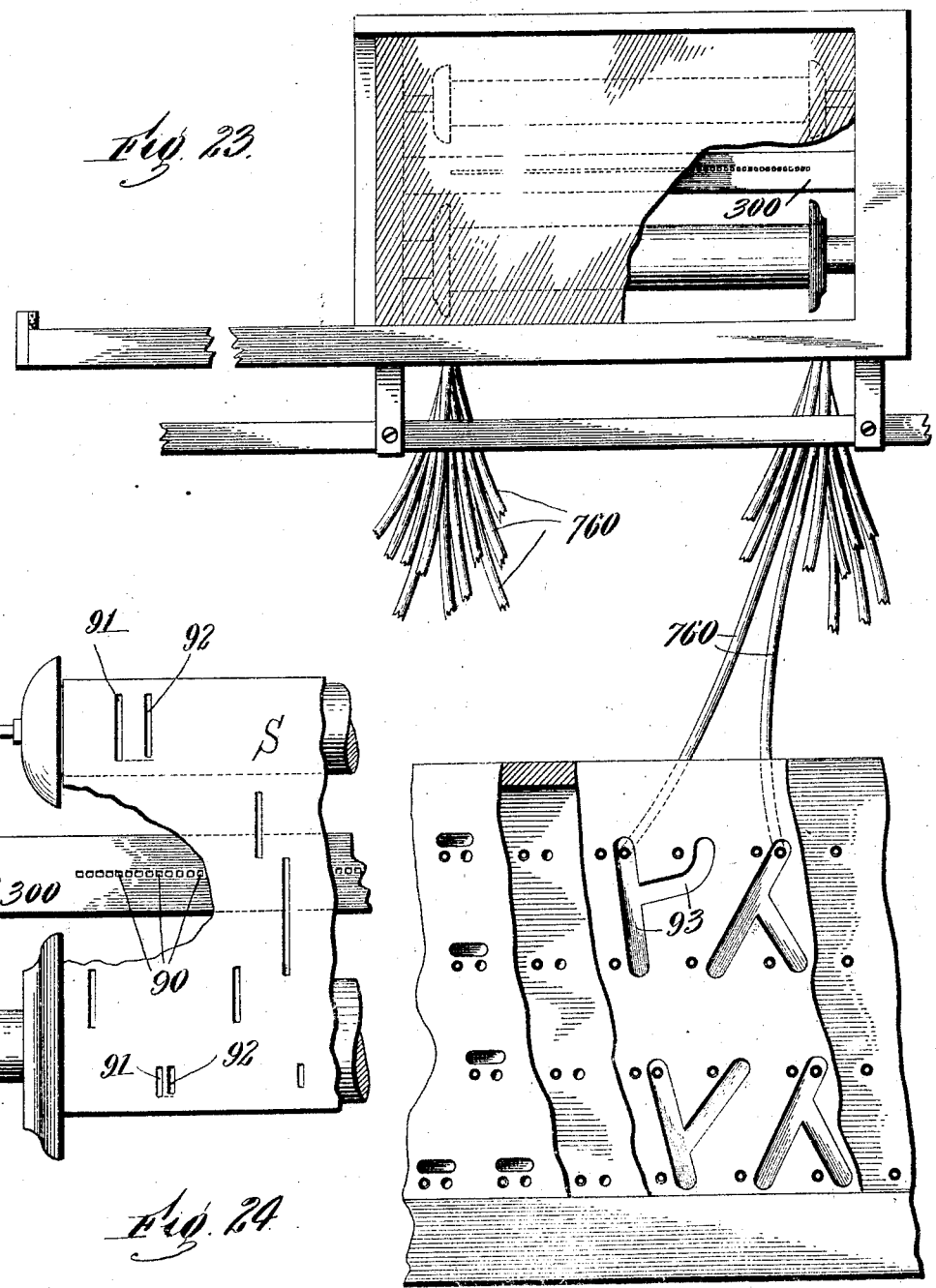

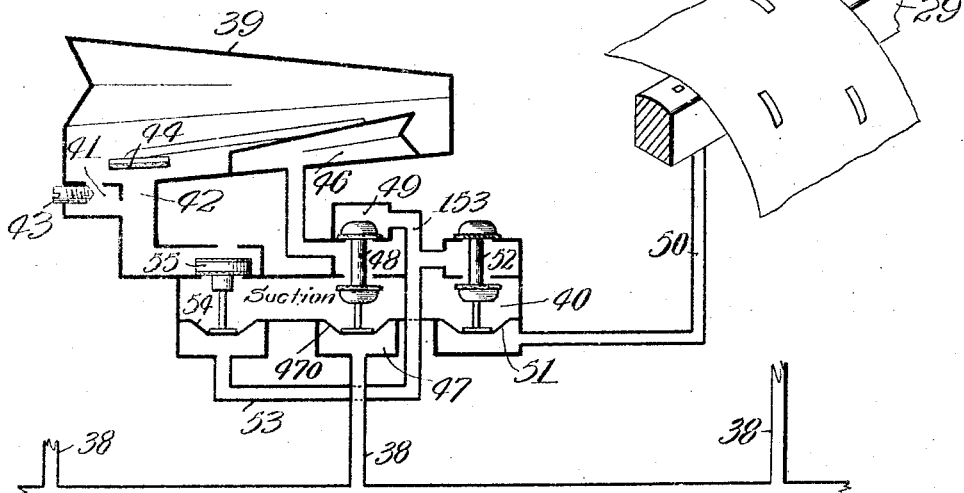
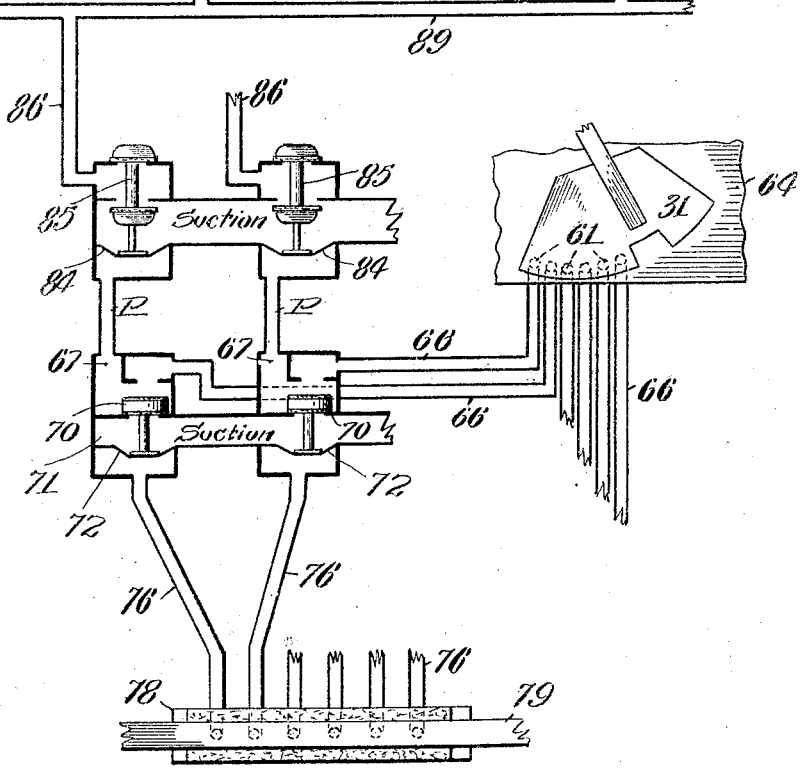

PETER WELIN, OF NEWCASTLE, INDIANA, ASSIGNOR, BY MESNE ASSIGNMENTS, TO ALBERT KRELL, OF NEWCASTLE, INDIANA.

AUTOMATIC PLAYING ATTACHMENT FOR MUSICAL INSTRUMENTS.

No. 928,295.                Specification of Letters Patent.        Patented July 20, 1909.

Application filed December 7, 1905. Serial No. 290,749.

*To all whom it may concern:*

Be it known that I, PETER WELIN, a citizen of the United States, residing at Newcastle, in the county of Henry and State of Indiana, have invented a new and useful Automatic Playing Attachment for Musical Instruments, of which the following is a specification.

This invention relates to that class of playing instrumentalities for pianos or similar musical instruments which sound melody or solo notes more loudly than notes of the accompaniment.

One object of the present invention is to provide a construction in which each of the striking pneumatics has a passage preferably comprising two channels leading thereto, one part or channel being adjustably restricted for securing soft playing effects, and the other being larger for sounding the notes more loudly. One particular advantage in providing for the individual restriction of the striking pneumatic is due to the fact that I am thus enabled to use restricting valves which can be adjusted in to different desired extents for different parts of the same action, so that any particular action can be tempered or adjusted to produce different degrees of restriction for various parts of the same action. This is desirable in practice, as it enables me to secure a gradual tempering down of the heavier bass notes, the striking mechanism for the lower or more prominent notes being more closely restricted than for the higher and weaker notes.

The modulation of the striking effects of playing attachments according to this invention can be manually controlled when music sheets of the ordinary character are employed, or can be automatically controlled directly from the music sheet itself when the music sheet is provided with supplemental throttling perforations.

The accompanying seven sheets of drawings illustrate the application of this invention to an interior player or to an automatic piano in which both the piano action and its playing devices are housed in a single casing.

Figure 1:
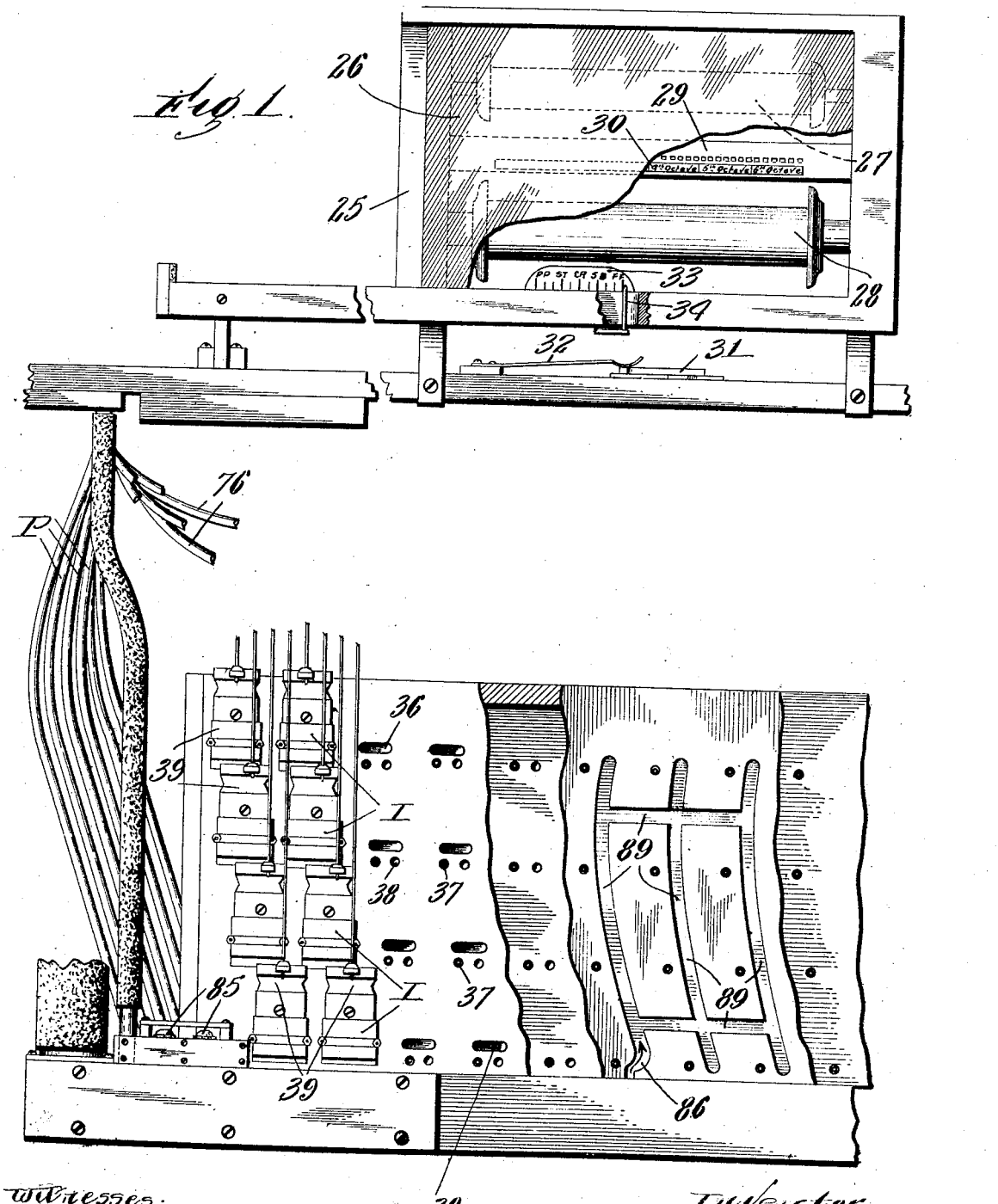
Figure 2:
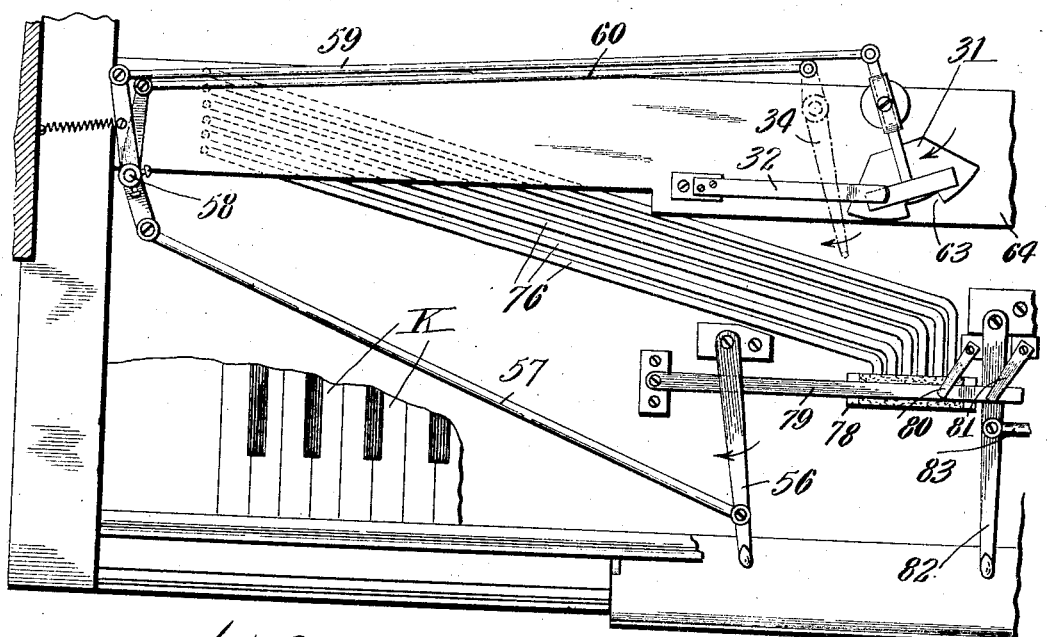
Figure 3:
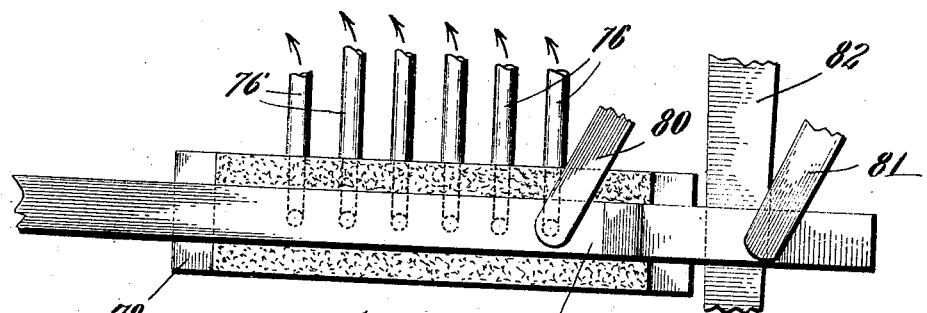
Figure 4:
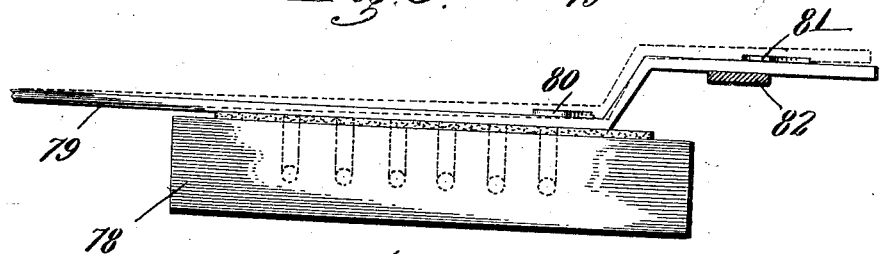

In these drawings, Figure 1 is a front view partly broken away of sufficient parts of an automatic piano to illustrate the application of the invention thereto. Fig. 2 is a plan view partly broken away showing the connections for controlling the modulation of the instrument by manual connections. Fig. 3 is an enlarged fragmentary plan view of part of the devices shown in Fig. 2. Fig. 4 is a front view of parts shown in Fig. 3. Fig. 5 is a detail view showing the controlling slide in normal position. Fig. 6 is a similar view showing the controlling slide swung to one side to produce a pianissimo effect for all the striking devices. Fig. 7 is a detail view showing the relation of the two sets of holes controlled by the slide. Fig. 8 is a detail view showing the arrangement of channels leading from the openings controlled by the slide. Fig. 9 is a detail view showing the arrangement of pockets containing cut-off valves. Fig. 10 is a sectional view showing the relation of the cut-off valves which are simultaneously operated to close the modulating channels whenever it is desired to sound a single isolated accented chord or phrase during the playing of longer pianissimo passages. Fig. 11 is a detail view further illustrating the arrangement of channels controlled from the slide. Fig. 12 is an additional detail view of the board shown in Fig. 9. Fig. 13 is a detail view of the suction chamber frame for the stop valves. Fig. 14 is a detail view of the stop valve operating pneumatics and bottom board therefor. Fig. 15 is a plan view of part of the bottom windchest. Fig. 16 is an enlarged plan view of part of what is shown in Fig. 15. Fig. 17 is a detail view showing an arrangement of primary controlled channels. Fig. 18 is a sectional view illustrating the lead of the primary controlled channels to groups of several striking pneumatics. Fig. 19 is a sectional view of one of the detachable units forming an element of a pneumatic action constructed according to this invention. Fig. 20 is a sectional view on the line 20—20 of Fig. 19. Fig. 21 is a sectional view on the line 21—21 of Fig. 19. Fig. 22 is a sectional view on the line 22—22 of Fig. 19. Fig. 23 is a detail view showing an arrangement of pipes or passages when an instrument constructed according to this invention is to be directly controlled by special music-sheets. Fig. 24 is a fragmentary view of sufficient parts of the tracker-board and winding-rolls to illustrate the arrangement of perforations in the music-sheet and of tracker board channels, and Fig. 25 is a diagrammatic view showing the form of the device illustrated in the first twenty-two figures.

In that class of instrument to which this invention relates in order to produce accented or solo effects it is the practice to divide the pneumatic action usually into two sections, and to provide for actuating the pneumatics of one part of the action under high tension and the remaining pneumatics under low tension. These so-called divided actions are able to produce the correct accenting of a melody only in cases where the melody is confined to either one division or the other of the action. In musical compositions where the melody changes frequently from the treble to the bass, it is not feasible to secure the accurate phrasing of the melody by means of these ordinary divided actions.

In an automatic musical instrument constructed according to this invention, I have increased the range of effects that can be produced by automatically throttling each individual striking pneumatic. When the throttle of any particular striking pneumatic is closed, the pneumatic will be collapsed with comparatively little force, producing a soft-playing effect, but during the expansion or return of any one striking pneumatic to its normal position, the return flow of air is not compelled to pass through the restricted or throttled opening, the unrestricted return of each striking pneumatic permitting an instrument constructed according to this invention to produce the most rapid repetitions or trills even when the instrument is being played for pianissimo effects.

In connection with the following description, reference should be had to Fig. 25 for a general illustration of the connection of the various parts with each other.

In the first five sheets of drawings, I have illustrated connections for manually controlling the throttling of the striking pneumatics.

As shown in Fig. 1, 25 designates the ordinary tracker-box. The front of the box is provided with the usual ways for holding a glass panel 26. Mounted in the box 25 is the usual music-spool 27, and also mounted in the box is the usual winding roll 28 for winding the music-sheet over the tracker-board 29. These parts may be of the ordinary or approved construction. In order that the eye may more readily follow the perforations of the music sheet, I employ a graduated scale or strip 30 in connection with the tracker-board. This strip 30 is usually cemented to the glass 26 so that it will appear directly below the line of tracker-board channels. The particular graduated scale which I have herein illustrated is divided into divisions corresponding to the tracker-board channels of each octave, the drawings of the present application for patent having been taken from a six octave instrument.

Also located in the box 25 in position to be inspected through the glass cover 26 is a graduated scale 33 coöperating with which is a pointer 34. The pointer 34 is movable from the position illustrated in Fig. 1 by means of connections hereinafter described, in order to show what striking pneumatics of the action are throttled to produce pianissimo effects. For example, in the particular construction illustrated in Fig. 1, the pointer 34 shows that the entire action is unrestricted, producing its loudest effects, but when the pointer 34 is shifted to the left, it shows the successive octaves which are throttled in succession from the bass upwardly.

Below the music-box 25 is a swinging or cover valve 31 which will be hereinafter described at length, and which is held down by a spring 32. The cover valve 31 controls a number of channels which connect to pipes P. The arrangement of channels will be hereinafter described.

In the present construction, six pipes P are employed, one corresponding to each octave of the instrument, and the pipes are led down to the bottom wind-trunk of the action frame.

Detachably secured to the action frame or back-board are the individually removable valve-boxes and striking pneumatics I. Each of the elements I corresponds to a certain note to be sounded. Leading to each of these individual elements I are three channels, a main suction channel 36, a note channel 37, and a modulating channel 38 for throttling the action of the striking pneumatic. The detailed construction of each of these individual elements or combined striking pneumatic and valve box is most clearly illustrated in the sixth sheet of drawings. As shown in Fig. 15, each of these elements comprises a striking pneumatic 39 which is connected to the piano action in the usual way, and to a suction chamber 14 which is connected to a corresponding suction channel on the wind trunk. When the individual elements are secured in place on the back-board, each element will be connected as follows: The chamber 40 of the element will be connected with a suction channel 36. The modulating channel 38 will be connected to a channel 47 in the element, and the note channel 37 will be connected to a channel 370 in the element, small pipes 50 being inserted through the back-board to make this connection, and these pipes being connected by the usual small lead or rubber pipes to the holes in the tracker-board. Opening from the striking pneumatic 39 are two channels 41 and 42. The constantly open channel 41 is the restricted channel, and threaded into position is an adjustable pointed restricting valve or screw 43, adapted to be adjusted manually in an obvious manner. By providing an adjusting screw for restricting the passage of each striking pneumatic, I am enabled to secure a proper tempering or adjustment of the entire action. That is to say, by the adjustment of the several screws 43, I am enabled to modulate or graduate the striking effects of the several striking pneumatics when operated to produce pianissimo effects. I have found this to be a feature of practical importance, because when the hammers of a piano action are struck with uniform force, the heavier or bass strings will predominate, the result being that in the use of nearly all automatic piano players the bass notes are disagreeably sounded; whereas in an action equipped according to this invention, by properly tempering the striking effects of the pneumatics by means of an individual adjustment of the screws 43, the bass notes need not be sounded any more loudly than required to produce the best artistic effects when softer passages are being played. The larger or more open passage 42 of each element opening into the striking pneumatic 39 is controlled by a throttling valve 44 which may be forced down to closed position by means of a spring 45, or which may be raised to open position by means of an actuating pneumatic 46.

The loud or soft striking of the pneumatic 39 depends upon whether the valve 44 is opened or closed during the collapse of the pneumatic. Preferably, also, I provide for automatically opening the valve 44 whenever the pneumatic is expanding or returning to normal position in order to provide for quick responsive action. The shutting of the valve 44 to produce pianissimo effects is controlled by the admission of atmospheric air to the channel 47 which will raise a pneumatic 470 and lift a switch valve 48. The raising of the switch valve 48 will close the connection between the pneumatic 46 and suction chamber 40, and will open connection to a closed chamber 49. The pneumatic 46, however, will not respond to produce a throttling action, when atmospheric air is admitted to channel 47, until an air impulse corresponding to a note to be sounded is admitted through the pipe 50 by reason of the following arrangement. As shown most clearly in Fig. 22, the pipe 50 leads to a pneumatic 51. As shown in Fig. 19, the pneumatic 51 raises a primary valve 52 admitting atmospheric air into the chamber 49 through passage 153 to expand the pneumatic 46, and also admitting atmospheric air through a channel 53 to raise a pneumatic 54 and lift a secondary valve 55. The lifting of the secondary valve 55 connects the striking pneumatic 39 to the suction chamber 40 either through the throttled passage 41 alone or through the same passage and also through the larger passage 42 according to whether the valve 44 is closed or opened. Thus if the passage 47 is closed, the valve 48 will be in the position shown in Fig. 19, and when a note impulse comes in through pipe 50 the secondary valve 55 will be lifted, and the pneumatic 39 will be collapsed quickly by reason of the free flow of the air through the unrestricted passage 42. When the passage 47 is connected to the atmosphere, the valve 48 will move upward to its other position, putting the pneumatic 46 in communication with the chamber 49. This will not affect the valve 44, but, just so soon as a note impulse comes in through the pipe 50 and the primary valve 52 rises, the chamber 49 will be put into communication with the atmosphere, and the pneumatic 46 will fill with air, whereby the spring 45 will immediately clap the valve 44 on its seat, so that now as the secondary valve 55 opens, the air can only be drawn from the pneumatic 39 through the adjustable restricted passage 41, whereby the blow or motion imparted by the striking pneumatic 39 will be modulated. When the parts are to be returned to normal position, the primary valve 52 will drop, and this will vent the pneumatic 46 as well as the pneumatic 54, so that whenever the striking pneumatic is to be supplied from the outside air through the channel or passage X, the valve 44 will be opened and a quick return of the movable section of the pneumatic 39 provided for. I regard this unrestricted return of the movable part of the striking pneumatic to normal position of importance, as this enables me to provide a pneumatic action capable of sounding extremely rapid repetitions or trills under very soft suction.

One set of connections which may be employed for the manual modulation or control of the instrument is shown in Fig. 2. Referring to this figure, 56 designates a modulating lever which is mounted to extend out below the piano keys K. Connected to the lever 56 is a link 57 for turning a vertical rock-shaft 58. Extending rearwardly from the rock-shaft 58 is an arm which is connected by a link 59 to turn the swinging valve 31 before referred to. Also extending rearwardly from the rock-shaft 58 is an arm connected by a link 60 to turn the pointer 34 before referred to, which shows what part of the action is being softened.

The relation of the valve 31 to its controlling channels is most clearly illustrated in Figs. 5 to 7. As shown in these figures, it will be seen that the swinging cover valve consists essentially of a sector of a disk swinging on top of a board 64. Opening up through the board 64 are two sets of channels 61 and 62. In the periphery of the swinging valve 31 is a notch or opening 63. When the valve 31 is in normal position, or when all the playing devices are being sounded with full power, both sets of channels 61 and 62 are closed as illustrated in Fig. 5. When the valve 31 is swung to the left from the position shown in Fig. 5, its notch 63 will serve to successively uncover the channels 61. The channels 61 preferably correspond to the octaves of an instrument, and the notch 63 is preferably wide enough to uncover three of the channels at a time, so that by swinging the cover valve 31 to different positions any three contiguous octaves within the range of the instrument may be played with pianissimo effect when desired. When the valve 31 is thrown to its extreme position to the left, as shown in Fig. 6, the entire set of channels 62 will be uncovered. As shown most clearly in Fig. 7, the respective channels 62 are connected to corresponding ones of the channels 61 so that when the valve 31 is in the position illustrated in Fig. 6, all the channels corresponding to all the octaves will be thrown open, so that the entire action will be sounded with pianissimo effects. The channels 61 extend down through board 64 to channels cut in the underside of a board 65, which connect through holes to channels 66 in the upper surface of the board 65. Each one of the channels 66 terminates adjacent to a channel 67, and in the ends of the respective channels 66 and 67 are bored holes extending down to valve pockets 69 in a board 68. The relations of the several channels 66 and 67 are shown more clearly in Fig. 11.

As shown, each of the valve pockets 69 contains a shut-off valve 70, and when the shut-off valves 70 are simultaneously raised through connections hereinafter described, they will simultaneously cut off the respective channels 66 and 67, and will also vent the channels 67 to a suction chamber 71. These valves 70 and means for venting the channels 67 are provided for playing individually accented chords where the same occur in the middle of pianissimo passages, and are preferably controlled from the same lever which serves as the tempo lever. To accomplish this, each of the stop valves 70 is controlled by a pneumatic 72. Leading from the pneumatics 72 are passages 73 which connect to pipes 76. As shown most clearly in Fig. 2, the pipes 76 are connected at their other ends to a board 78. The upper surface of the board 78 is covered with leather, and resting on the leather so as to cover the openings leading to the pipes 76 is a metal strip 79 held down by spring-arms 80 and 81.

Below the strip 79 is a swinging lever 82, which is preferably connected by a link 83 to control the winding of the music sheet or vary the time of the music through ordinary connections which need not be herein described. I preferably employ this tempo lever to produce the accenting of individual chords when desired by giving the same a slight upward lift as indicated by dotted lines in Fig. 4, whereby the entire series of pipes 76 will be simultaneously vented, and the momentary sounding of a loud chord will be permitted. I consider this a feature of advantage, because in controlling a piano player the operator is required to keep the tempo lever in hand practically all the time, and by utilizing the lifting of the tempo lever for thus accenting individual chords, I am enabled to secure such effects without the use of an additional stop or finger-key which could not well be taken care of.

Referring now to Figs. 15 to 18 inclusive, in order to explain the passages controlled from the pipes P it will be seen from Fig. 16 that each of the pipes P is connected to operate a pneumatic 84. As shown in Fig. 18, each pneumatic 84 lifts a primary valve 85. The lifting of a primary valve 85 vents a passage 86 admitting atmospheric air to said passage. The wind chest of the action, and each of the channels 86 is preferably connected to control or simultaneously modulate the notes of an entire octave. This is shown in Fig. 1, in which it will be seen that one of the six channels 86 is connected by means of branch channels 89 to connect with twelve of the individual note elements which form the octave. By means of this particular division it is possible to modulate the striking devices of groups of notes of twelve, and I have found this a convenient division where a manual control is desired.

A pneumatic playing mechanism constructed according to this invention can be controlled not only manually, but is also adapted to be controlled automatically directly from the music sheet itself. A construction for this purpose is illustrated in Figs. 23 and 24. As shown in Fig. 24, the tracker-board 300 in addition to its ordinary note-channels is provided with interspaced modulating channels 90. In practice I have used one modulating channel to control the striking devices for three successive notes of the musical scale. This I find to be a convenient division for controlling the action as it is well known under the laws of harmony that perfect musical chords do not usually contain two of any three successive musical tones, however I may use one modulating channel for each note or for any number of notes.

In the music sheets which I have employed, the sheet S is not only provided with the ordinary note perforations 92, but is also provided with supplemental controlling perforations 91 which are slightly in advance of the corresponding note perforations 92. The channels 90 of the tracker-board controlled by the modulating perforations 91 are connected by pipes 760 to the back-board of the pneumatic action, and each of said pipes 760 is connected by means of branch channels 93 to control three of the individual striking pneumatics. It is obvious, of course, that the number of controlling channels in the tracker-board may be greater or less if desired, although by the construction illustrated, I have been enabled to secure the individual accenting of any desired notes of entire musical compositions, and I regard this capacity of a pneumatic playing mechanism of my invention to be directly controlled from the music sheet, as of particular importance, because it insures an absolutely correct accenting of an entire musical composition directly from the music sheet without any manual selection or control being required.

Where my invention is to be applied to cabinet piano-players instead of to a piano player inside of a piano casing, it is to be understood that the striking pneumatics may, if desired, strike upwardly instead of being pulled downwardly as shown.

While I have illustrated and described two forms in which the invention may be conveniently embodied, I am aware that many other modifications may be made by any person skilled in the art without departing from the scope of the invention as expressed in the claims. Therefore I do not wish to be limited to the particular forms illustrated, but What I do claim is:—

1. In an automatic music playing device, the combination of the striking pneumatics, passages thereto, a valve in a passage to each striking pneumatic, a pneumatic for operating each of said valves to close the valve and reduce the passage of air from each pneumatic when the same is collapsing to produce a soft playing effect, and to open the valve positively to permit an unrestricted return of the striking pneumatic to normal position.

2. In a piano player or automatic playing attachment for musical instruments, the combination of a striking pneumatic, a suction chamber, a wind-way from the pneumatic to the suction chamber comprising a constantly open channel and a second channel, and an individual means for reducing the passage of air from each striking pneumatic when the same is being collapsed to produce a soft playing effect and for opening the second channel from said striking pneumatic to the suction chamber when the pneumatic is expanding or returning to normal position.

3. In a piano player or automatic playing attachment for musical instruments, the combination of the striking pneumatics, passages thereto, a valve for each of said striking pneumatics, and means for closing the valve for reducing the passage of air from each pneumatic when the same is collapsing to produce a soft playing effect, and for opening the valve for permitting an unrestricted return of the striking pneumatic to normal position.

4. In a piano player or automatic playing attachment for musical instruments, the combination of the striking pneumatics, two passages of different size leading to each of the striking pneumatics, means for throttling or restricting the smaller of said passages, a valve for the larger passage, and means for closing the valve to throttle the passage to the striking pneumatic when a soft playing effect is desired, and for opening the valve for providing an unrestricted return of the striking pneumatic to normal position.

5. In a piano player or automatic playing attachment for musical instruments, the combination of the striking pneumatics, two passages leading to each of said striking pneumatics, an adjustable screw for restricting one of the passages of each pneumatic, a valve for the other passage of each pneumatic, and means for closing said valve when a soft playing effect is desired from any particular striking pneumatic, and for opening the valve for permitting an unrestricted return of the striking pneumatic to normal position.

6. In an automatic music playing device, having a tracker board and tracker-board connections, the combination of the striking pneumatics, an individual throttle for each striking pneumatic, a throttle pneumatic for each throttle, and means for letting air into or out of any one or more of said throttle pneumatics from connections independent of the tracker-board connections.

7. In an automatic playing device for music, the combination of striking pneumatics, secondary valves therefor, an individual throttle for each striking pneumatic, a pneumatic for controlling each throttle, and primary valves, each controlling both a secondary valve and a throttle pneumatic.

8. In a music playing device, the combination of striking pneumatics, a valve for controlling a passage to each of said pneumatics, an individual throttle for each of said striking pneumatics, a throttle controlling pneumatic, and a single means for controlling both the controlling valve for the striking pneumatic and the throttle controlling pneumatic.

9. In a piano player or automatic playing attachment for musical instruments, the combination of the striking pneumatics, a valve for controlling a passage to each of said striking pneumatics, an individual throttle for each of said striking pneumatics, an operating pneumatic for controlling the individual throttling action, a switch valve for normally preventing throttling except when a soft playing effect is desired, and a single means for controlling said controlling valve for the striking pneumatic and the means for throttling the same when the switch-valve is opened.

10. In a piano player or automatic playing attachment for musical instruments, the combination of the striking pneumatics, a throttle and a throttle operating pneumatic inclosed in each of said pneumatics, a secondary valve for the striking pneumatic, a secondary pneumatic, a switch valve for preventing the operation of the throttle pneumatic except when a soft playing effect is desired, and a single primary valve for controlling the secondary pneumatic and the means for throttling the striking pneumatic when the switch valve is opened, and for flushing the throttling pneumatic when the striking pneumatic is returning to normal position.

11. In a piano player or automatic playing attachment for musical instruments, the combination of a pneumatic action comprising independently removable elements, each consisting of a striking pneumatic, a throttle and a throttling pneumatic inclosed therein, a suction chamber, a switch valve for preventing the throttling pneumatic from acting except when a soft playing effect is desired, a secondary valve, and a primary valve and connections for controlling the operation of the secondary valve and also the throttling pneumatic serving to flush the throttling pneumatic when a soft playing effect is desired and to vent the throttling pneumatic for permitting a quick return of the striking pneumatic.

12. In a music playing device, the combination with the striking pneumatics each containing a throttle and an operating pneumatic inclosed therein, of a secondary valve for the striking pneumatic, a switch valve for preventing the operation of the throttle operating pneumatic except when a soft playing effect is desired, and primary valves, each for controlling a secondary valve and a throttle operating pneumatic when the switch valve is open, said primary valve also constituting means for venting the throttle pneumatic when the striking pneumatic is returning to normal position.

13. In an automatic playing attachment for musical instruments, the combination of striking pneumatics, a throttle in the operating passage to each pneumatic for reducing the passage of air when a soft playing effect is desired, and hand-controlled means for selecting which octaves of the striking pneumatic shall be played with soft effect.

14. In a piano player or automatic playing attachment for musical instruments, the combination of a tracker-board provided with channels, striking pneumatics controlled from the tracker board channels, means for individually throttling the passage to each striking pneumatic from which a soft playing effect is desired, and means for manually controlling the throttling action.

15. In a piano player or automatic playing attachment for musical instruments, the combination of the striking pneumatics, an individual throttling means for each of the striking pneumatics for reducing the passage of air therefrom when a soft playing effect is desired, and hand-controlled means for selecting which striking pneumatics will be operated to produce soft playing effects.

16. In a piano player or automatic playing attachment for musical instruments, the combination of the striking pneumatics, individual throttling devices for reducing the passages of air from the striking pneumatics which are to be operated with soft playing effects, and hand-controlled means for selecting striking pneumatics controlling the notes of different octaves so that the same may be played with a soft playing effect.

17. In a piano player or automatic playing attachment for musical instruments, the combination of pneumatic actions having a plurality of channels, means for softening the playing effects of the striking pneumatic of each action, and a hand-controlled slide or valve for uncovering successive channels whereby the striking pneumatics to be operated to produce soft playing effects may be selected.

18. In a piano player or automatic playing attachment for musical instruments, the combination of a pneumatic action, means for controlling the striking pneumatics to produce pianissimo effects including a series of channels, a swinging valve capable of covering all of said channels, and of uncovering a plurality of any desired contiguous ones, and means for operating said swinging valve to uncover successive channels to soften the striking effects of different striking pneumatics, or to uncover the entire series of channels when a pianissimo effect is desired for the entire action.

19. In a piano player or automatic playing attachment for musical instruments, the combination of a pneumatic action, a number of channels, means controlled by said channels for operating the pneumatic action with full striking effect for the playing of accented chords or phrases, a pivoted hand lever having connections for regulating the tempo when swung to different positions about its pivot, and means controlled by said lever for normally closing said channels and adapted to expose them when the lever is moved in a direction parallel to its pivot.

20. A music playing device having a pneumatic action, channels, means connected with and controlled by said channels for modifying the striking effect of the pneumatic action, means for regulating the tempo, a pivoted lever for operating the regulating means when swung on its pivot, and means normally closing said channels in all positions of the lever when the lever is swung on its pivot and controlled by said lever, when the lever is moved at an angle to the plane of its swinging motion, to expose said channels.

21. In an automatic playing device for music, the combination of striking pneumatics, a throttle valve for regulating the action of each pneumatic, pneumatics controlling said throttle valves, a hand operated valve, successive channels which the same controls, a primary valve controlled from each of said channels, and connections and passages therefrom controlling a number of throttle pneumatics and thereby controlling the striking effects of a number of striking pneumatics of the action.

22. In a piano player or automatic playing attachment for musical instruments, the combination of the striking pneumatics, a plurality of channels, an individual throttling means for each of said striking pneumatics, a manually operated slide for opening successive channels, a switch valve operated from each of said channels to effect the operation of the individual throttling devices, a stop valve for each of said channels, a tempo lever and means controlled from the tempo lever for closing the stop valves to permit full striking effect from the pneumatics for the playing of accented chords or phrases in pianissimo passages.

23. In a music playing device, the combination of a series of pneumatics, a passage communicating with each, a plate having a series of perforations, one connected with each of said passages, and a valve having a notch for uncovering certain of said perforations when the valve is moved.

24. In a music playing device, the combination of a series of pneumatics having passages connected therewith, a cover plate having two series of perforations, one perforation of each series being connected with one passage of each series, and a valve having a notch for uncovering the passages of one series, said valve being adapted to uncover those of the other when its end is moved beyond a certain point.

25. In a music playing device, the combination of a series of pneumatics, a plate having two series of passages, one passage of each series being provided with connections to a pneumatic, the passages of one series being located substantially in a line, the passages of the other series being located in alinement at an angle to the first mentioned line, and a valve having a notch adapted to successively uncover the passages of the second series as the valve moves.

26. In a music playing device, the combination with a striking pneumatic, of a suction chamber, a connection from the pneumatic to the suction chamber, a valve for controlling said connection, a valve for materially regulating the size of said connection, said regulating valve being capable of operation independently of the first named valve, a pneumatic located within the striking pneumatic and constituting means for operating the first named valve and a valve for controlling the connection of the striking pneumatic with the suction chamber and also with the open air through said connection.

27. In a music playing device, the combination with a striking pneumatic, of a suction chamber, a passage for connecting the striking pneumatic with the suction chamber, a valve for closing the principal part of said passage, a valve for materially restricting said passage having manually controlled means for operating it, a pneumatic having a movable leaf under the influence of the air in the striking pneumatic connected with the first named valve for operating it, a primary valve, and a secondary valve controlled by said primary valve for controlling said passage independently of the restricting valve and for connecting said passage with the open air.

28. In a piano player or automatic playing attachment for musical instruments, the combination of striking pneumatics, a suction chamber, passages connecting each striking pneumatic with the suction chamber and each constituting the inlet and outlet of its striking pneumatic, and a throttling means for reducing the passage of air from each striking pneumatic when the same is being collapsed to produce a soft playing effect and for leaving the passage free when the pneumatic is expanding or returning to normal position.

29. In a piano player or automatic playing attachment for musical instruments, the combination of a pneumatic action, and means for controlling the striking pneumatics to produce pianissimo effects, including a series of channels and a swinging valve capable of covering all of said channels and of uncovering a plurality of any desired contiguous ones.

In testimony whereof I have hereunto set my hand, in the presence of two subscribing witnesses.

PETER WELIN.

Witnesses:
 EDWIN B. PFAU,
 CHARLES L. DENGLER.